(12) United States Patent
Ma et al.

(10) Patent No.: US 11,996,567 B2
(45) Date of Patent: May 28, 2024

(54) BATTERY MODULE

(71) Applicant: SK Innovation Co., Ltd., Seoul (KR)

(72) Inventors: Myeong Hwan Ma, Daejeon (KR); Seok Min Kim, Daejeon (KR); Seo Roh Rhee, Daejeon (KR); Hae Ryong Jeon, Daejeon (KR); Seung Hoon Ju, Daejeon (KR); Yang Kyu Choi, Daejeon (KR); Dong Ha Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 67 days.

(21) Appl. No.: 17/101,289

(22) Filed: Nov. 23, 2020

(65) Prior Publication Data
US 2021/0159469 A1    May 27, 2021

(30) Foreign Application Priority Data

Nov. 22, 2019 (KR) .................. 10-2019-0151368
Nov. 19, 2020 (KR) .................. 10-2020-0155591

(51) Int. Cl.
| | | |
|---|---|---|
| H01M 50/16 | (2021.01) | |
| H01M 10/42 | (2006.01) | |
| H01M 10/613 | (2014.01) | |
| H01M 10/6554 | (2014.01) | |
| H01M 50/116 | (2021.01) | |
| H01M 50/24 | (2021.01) | |

(52) U.S. Cl.
CPC ..... *H01M 50/116* (2021.01); *H01M 10/4207* (2013.01); *H01M 10/613* (2015.04); *H01M 10/6554* (2015.04); *H01M 50/24* (2021.01)

(58) Field of Classification Search
None
See application file for complete search history.

(56) References Cited

U.S. PATENT DOCUMENTS

| | | | | |
|---|---|---|---|---|
| 2015/0140411 | A1* | 5/2015 | Li ................... | H01M 50/124 |
| | | | | 429/163 |
| 2016/0211494 | A1* | 7/2016 | Kurosu ............. | H01M 50/227 |
| 2018/0076493 | A1 | 3/2018 | Park et al. | |
| 2018/0183119 | A1 | 6/2018 | Ju et al. | |

(Continued)

FOREIGN PATENT DOCUMENTS

| | | |
|---|---|---|
| CN | 108242521 A | 7/2018 |
| CN | 108475831 A | 8/2018 |

(Continued)

OTHER PUBLICATIONS

Office Action ifor the Chinese Patent Application No. 202011312486.4 issued by the Chinese Patent Office on May 23, 2023.

(Continued)

*Primary Examiner* — Alix E Eggerding
(74) *Attorney, Agent, or Firm* — IP & T GROUP LLP

(57) ABSTRACT

A battery module includes a plurality of secondary battery cells, a housing member accommodating a plurality of the secondary battery cells therein, and an insulating member disposed on an inner surface of the housing member, preventing flow of electrical current to the housing member, having a heat transfer function to discharge heat of the secondary battery cell externally, and formed to have a predetermined thickness.

12 Claims, 3 Drawing Sheets

(56) References Cited

U.S. PATENT DOCUMENTS

2018/0358592 A1   12/2018   Park et al.
2018/0375077 A1   12/2018   Shin et al.
2020/0277432 A1*   9/2020   Park ...................... H01M 50/20

FOREIGN PATENT DOCUMENTS

| | | |
|---|---|---|
| CN | 109845024 A | 6/2019 |
| DE | 102012222689 A1 | 6/2014 |
| JP | 2011-034775 A | 2/2011 |
| KR | 10-2014-0034413 A | 3/2014 |
| KR | 10-1408539 B1 | 6/2014 |
| KR | 20170095040 A | 8/2017 |
| KR | 10-2019-0089586 A | 7/2019 |
| KR | 20190084223 A | 7/2019 |
| KR | 10-2019-0113585 A | 10/2019 |
| WO | 2012/013789 A1 | 2/2012 |
| WO | 2012/133709 A1 | 10/2012 |

OTHER PUBLICATIONS

Office Action for the Korean Patent Application No. 10-2020-0155591 issued by the Korean Intellectual Property Office on Sep. 26, 2023.

* cited by examiner

BATTERY MODULE

CROSS-REFERENCE TO RELATED APPLICATION(S)

This application claims the benefit under 35 USC 119(a) of Korean Patent Application Nos. 10-2019-0151368 filed on Nov. 22, 2019 and 10-2020-0155591 filed on Nov. 19, 2020 in the Korean Intellectual Property Office, the entire disclosure of which is incorporated herein by reference for all purposes.

BACKGROUND

The present disclosure relates to a battery module.

As technological development and demand for mobile devices and electric vehicles increase, demand for secondary batteries as an energy source is rapidly increasing. A secondary battery is a battery that may repeat charging and discharging because mutual conversion between chemical energy and electrical energy is reversible.

Such secondary batteries include a nickel cadmium battery, a nickel hydride battery, a nickel zinc battery, a lithium secondary battery, and the like, and a representative battery thereof is a lithium secondary battery.

Such lithium secondary batteries use lithium oxide as a positive electrode active material and carbon as a negative electrode active material, which become a positive plate and a negative plate, respectively, and a separator is placed therebetween. An exterior material that seals the electrode assembly in this arrangement as described above, together with an electrolyte, is included, and there may be classified as a prismatic secondary battery or a pouch-type secondary battery according to the type of the exterior material.

When secondary battery cells are installed in devices such as automobiles and energy storage systems (ESS), to increase output and capacity, a plurality of secondary battery cells are electrically connected to constitute a battery module.

However, a battery module comprised of a plurality of secondary battery cells requires electrical stability due to electrical characteristics, but in the related art, a configuration capable of securing such electrical stability has not been separately presented.

Therefore, there is a need for research into a battery module to prevent the above-described problem.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide a battery module that may secure electrical stability.

Exemplary embodiments provide a battery module capable of maintaining cooling performance while ensuring electrical stability.

According to an exemplary embodiment, a battery module includes a plurality of secondary battery cells, a housing member accommodating a plurality of the secondary battery cells therein, and an insulating member disposed on an inner surface of the housing member, preventing flow of electrical current to the housing member, having a heat transfer function to discharge heat of the secondary battery cell externally, and formed to have a predetermined thickness.

The insulating member may have a thickness at which withstand voltage performance between the insulating member and the housing member is formed to be greater than at least 2000 kV.

The insulating member may have a thickness at which thermal conductivity, in a direction, parallel to a direction in which the insulating member and the housing member are combined, is greater than at least 150 W/mK.

The insulating member may have a thickness of 50 μm to 200 μm.

The insulating member may be formed to have a thickness of 70 to 150 μm.

The insulating member may be formed of a melanin-based resin, an acrylic-based resin, an epoxy-based resin, an olefin-based resin, an EVA-based resin or a silicone-based resin.

The insulating member may be comprised of a plurality of layers, and at least one layer among the plurality of layers may be formed of a different material.

The insulating member may be characterized in that an outermost layer closest to the secondary battery cell is formed of a material having a highest withstand voltage performance.

The insulating member may include a bottom insulating portion disposed on a cooling plate member of the housing member in contact with bottom surfaces of a plurality of the secondary battery cells, and a sidewall insulating portion formed on a sidewall member of the housing member provided at an edge of the cooling plate.

The bottom insulating portion may be formed to have thermal conductivity higher than thermal conductivity of the sidewall insulating portion.

The sidewall insulating portion may have a withstand voltage performance higher than a withstand voltage performance of the bottom insulating portion.

The sidewall insulating portion may be formed to have a thickness greater than a thickness of the bottom insulating portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
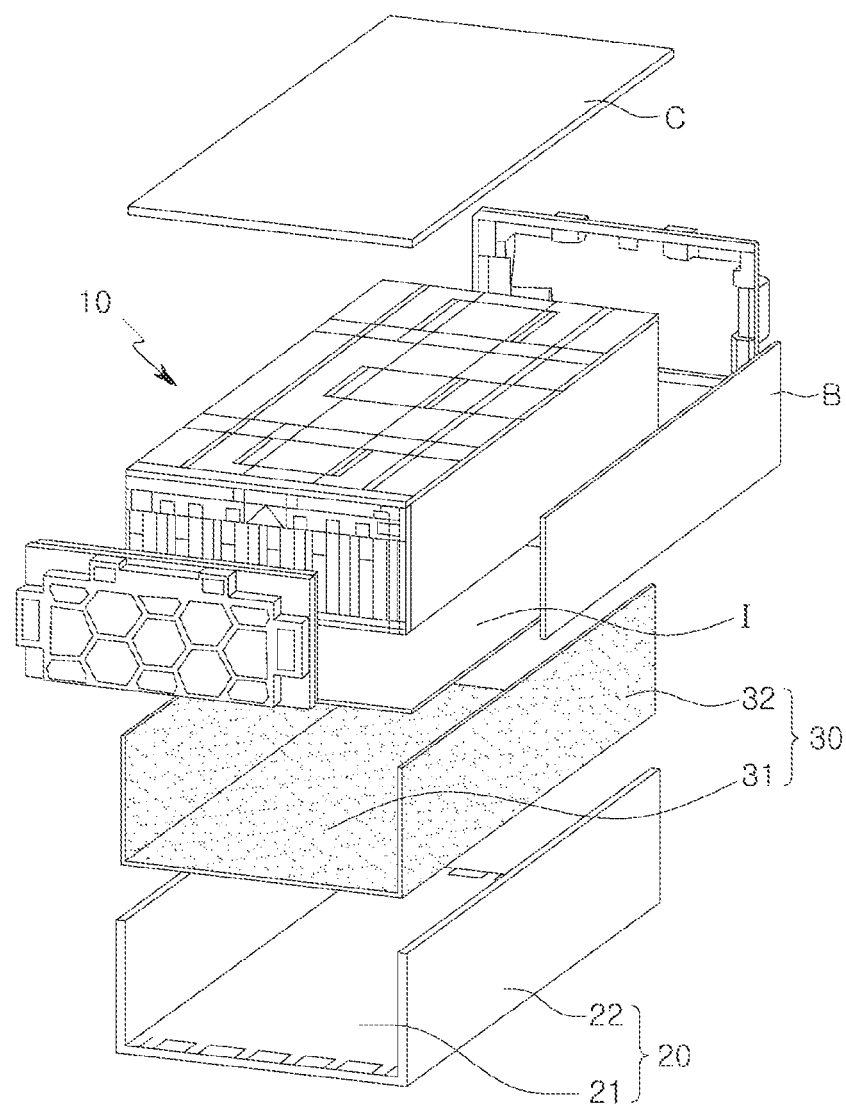
FIG. 1 is a perspective view illustrating a battery module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first, " "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a, " "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent, after an understanding of the disclosure of this application.

The drawings may not be to scale, and the relative size, proportions, and depiction of elements in the drawings may be exaggerated for clarity, illustration, and convenience.

A battery module according to an embodiment of the present disclosure is provided, and in the battery module, electrical stability may be improved by securing withstand voltage performance, and in addition, cooling performance may be maintained while ensuring electrical stability. Accordingly, electrical stability may be improved and cooling performance may be maintained while reducing costs and extending the life of the battery module, in the battery module according to an embodiment.

In detail, in the case of a related art battery module, a separate configuration for securing electrical stability is not provided, but in the present disclosure, an insulating member 30 is provided to improve withstand voltage performance and thus improve electrical stability.

In addition, to secure such electrical stability, the proposed insulating member 30 prevents the problem of deteriorating the cooling performance of the battery module, and a thickness t of the insulating member 30 for this purpose is presented. Accordingly, the battery module according to an embodiment is configured to prevent waste of the insulating member 30, prevent an increase in the volume of the battery module, or reduce a decrease in space occupied by a secondary battery cell 10 to prevent a decrease in energy density.

Referring to the drawings in detail, FIG. 1 is a perspective view illustrating a battery module according to an embodiment. Referring to FIG. 1, a battery module according to an embodiment may include a plurality of secondary battery cells 10, a housing member 20 in which a plurality of the secondary battery cells 10 are accommodated, and an insulating member 30 formed on an inner surface of the housing member 20, preventing the flow of electrical current to the housing member 20, having a heat transfer function to discharge heat of the secondary battery cell 10 externally, and formed to have a predetermined thickness t.

As described above, since the battery module according to an embodiment includes the insulating member 30, to prevent the occurrence of a problem in which the voltage generated in the secondary battery cell 10 is transmitted to the housing member 20.

For example, by providing the insulating member 30, performance of withstand voltage greater than a withstand voltage that the secondary battery cell 10 may withstand may be secured, and accordingly, the battery module according to an embodiment may improve electrical stability.

Moreover, the thickness t of the insulating member 30 is limited not to be greater than the thermal conductivity of the housing member 20 at least. Therefore, the problem of deteriorating the cooling performance of the battery module according to an embodiment by providing the insulating member 30 may be prevented.

For example, when the housing member 20 is formed of aluminum (Al), the insulating member 30 is limited to be formed to have the thickness t less than a thickness corresponding to the thermal conductivity of the aluminum.

In this case, the insulating member 30 is formed of an insulator, and in the case in which the insulating member 30 is formed of an insulator other than a conductor as described above, it is confirmed that the thermal conductivity is inversely proportional to the thickness t of the insulating member 30, and accordingly, the thickness t of the insulating member 30 may be limited.

The thickness t of the insulating member 30 may also be limited to a numerical value, and details thereof will be described later with reference to FIGS. 2 and 4.

The secondary battery cell 10 has a configuration in which the mutual conversion between chemical energy and electrical energy reversibly repeats charging and discharging.

In this case, the secondary battery cell 10 may include an electrode assembly and a cell body member surrounding the electrode assembly.

The electrode assembly is substantially contained in an electrolyte and is used by being accommodated in the cell body member. The electrolyte may include a lithium salt such as $LiPF_6$, $LiBF_4$ or the like in an organic solvent such as ethylene carbonate (EC), propylene carbonate (PC), diethyl carbonate (DEC), ethyl methyl carbonate (EMC), dimethyl carbonate (DMC), or the like. Furthermore, the electrolyte may be liquid, solid or gel.

In addition, the cell body member protects the electrode assembly and accommodates the electrolyte. For example, the cell body member may be provided as a prismatic member, a pouch-shaped member, or a can-shaped member. In this case, the pouch-shaped member has a form in which the electrode assembly is sealed on three surfaces and is accommodated, and is configured to be sealed by overlapping and bonding the three surfaces of the upper and both side surfaces, excluding one surface portion which is mainly, for example, the lower surface portion, in a state in which the electrode assembly is accommodated therein. In addition, the can-shaped member has a form that accommodates the electrode assembly by sealing one surface thereof, and is configured to be sealed by overlapping one surfaces of the upper surface portion, excluding three surfaces which are mainly, for example, the lower surface and both side surfaces, in a state in which the electrode assembly is accommodated therein.

However, these prismatic secondary battery cells 10, pouch-type secondary battery cells 10, and can-type secondary battery cells 10 are only examples of secondary battery cells 10 accommodated in the battery nodule according to an embodiment. Therefore, the secondary battery cell 10 accommodated in the battery module is not limited to these types.

The housing member 20 serves as a body of a battery module in which the plurality of secondary battery cells 10 are accommodated.

For example, the housing member 20 has a configuration in which the plurality of secondary batteries are installed and serves to externally transmit electrical energy generated by the secondary battery while protecting the secondary battery, or to transmit external electrical energy to the secondary battery.

In this case, the housing member 20 is provided with a cooling plate member 21 to transfer heat generated from the secondary battery to an external heat sink, for cooling, and the cooling plate member 21 forms the bottom of the housing member 20.

In addition, a sidewall member 22 forming a side portion of the housing member 20 may be provided at an edge portion of the cooling plate member 21 provided on the bottom, and the cooling plate member 21 and the sidewall member 22 are connected so that the heat dissipation effect by the heat sink may be extended to the sidewall member 22.

Further, a compression member (B) may be provided on the inner surface of the sidewall member 22 to further firmly protect the secondary battery.

In addition, the housing member 20 may include a cover member C provided on an upper end of the sidewall member 22 to protect the upper end of the secondary battery.

In addition, the housing member 20 may also be provided with an additional component such as a bus bar electrically connecting the secondary battery to an external configuration.

In addition, the housing member 20 may also include a hear, conducting member I provided between the secondary battery cell 10 and the cooling plate member 21 to form a heat path transferring heat from the secondary battery cell 10 to the cooling plate member 21.

For example, the heat conducting member I serves to transfer heat generated during charging and discharging of the electrode assembly to the heat sink. To this end, the heat conduction member I may be provided between the cell body member in which the electrode assembly is accommodated and the cooling plate member 21 in contact with the neat. sink.

The insulating member 30 serves to insulate the secondary battery ceil 10 and the housing member 20.

For example, the problem in which the voltage generated in the secondary battery cell 10 is transmitted to the housing member 20 may be prevented by the insulating member 30.

In detail, by the insulating member 30, withstand voltage performance that is greater than withstand voltage performance that the secondary battery cell 10 may withstand may be secured, and accordingly, electrical stability of the battery module according to an embodiment may be improved.

Moreover, the thickness t of the insulating member 30 is limited not to at least be greater than the thermal conductivity of the housing member 20, thereby serving to maintain the cooling performance by the housing member 20 and insulate the secondary battery cell 10 and the housing member 20.

As an example, the insulating member 30 of the battery module according to an embodiment may be characterized in that the insulating member is formed to have a thickness t such that withstand voltage performance between the insulating member 30 and the housing member 20 is greater than at least 2000 kV.

In detail, the withstand voltage performance is in proportion to the thickness t of the insulating member 30, and the thickness t of the insulating member 30 is limited to have the withstand voltage performance greater than 2000 kV at least.

Thereby, the problem of uncontrolled current flow with the housing member 20, occurrence of electric shorts, and damage to the secondary battery cell 10 due to insulation breakdown due to the voltage generated in the secondary battery cell 10 may be prevented.

In addition, the insulating member 30 of the battery module according to an embodiment may be formed to have the thickness t at which thermal conductivity, in a direction P, parallel to a direction in which the insulating member 30 and the housing member 20 are combined, is greater than at least 150 W/mK.

In detail, it was confirmed through an experiment that the thermal conductivity of the insulating member 30 formed of an insulator, in a direction P, parallel to the direction in which the insulating member 30 and the housing member 20 are combined, is inversely proportional to the thickness t of the insulating member 30. Accordingly, the thickness t of the insulating member 30 is limited so that the thermal conductivity is greater than at least 150 W/mK.

Accordingly, even when the insulating member 30 is provided in the housing member 20, a problem in that the cooling performance is deteriorated by the housing member 20 may be prevented.

In detail, as an example, the housing member 20 may be formed of a material containing aluminum, and in this case, the thermal conductivity of the housing member 20 is greater than at least 150 W/mK. Accordingly, the thickness t of the insulating member 30 is also limited such that the thermal conductivity is greater than at least 150 W/mK.

The thickness t of the insulating member 30 may also be limited to a numerical value, and details thereof will be described later with reference to FIGS. 2 and 4.

Figure 2:
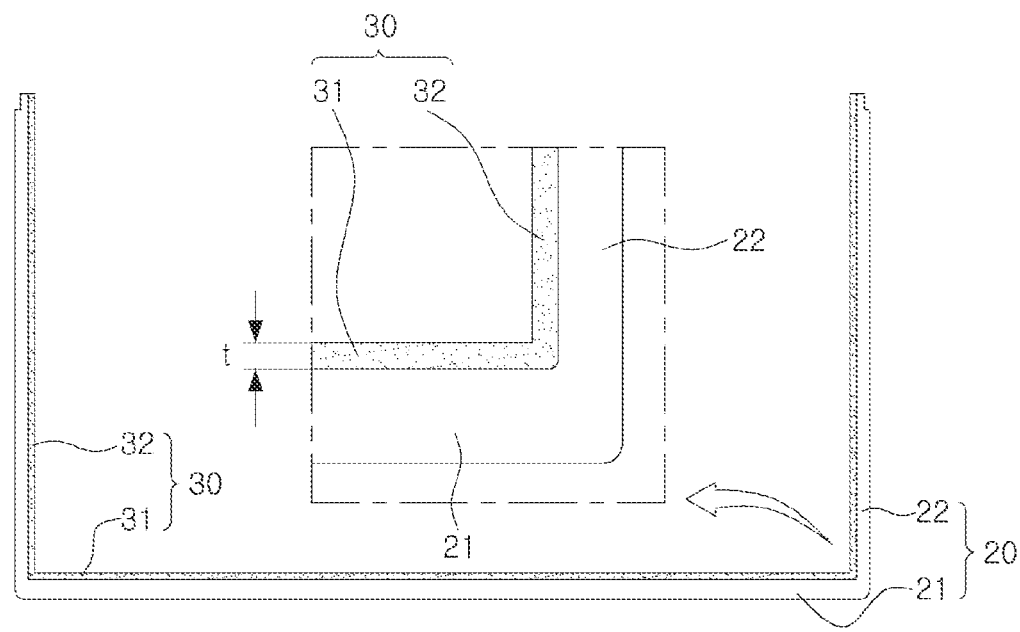
FIG. 2 is a front view illustrating a state in which an insulating member is formed in a housing member in a battery module according to an embodiment.
Figure 5:
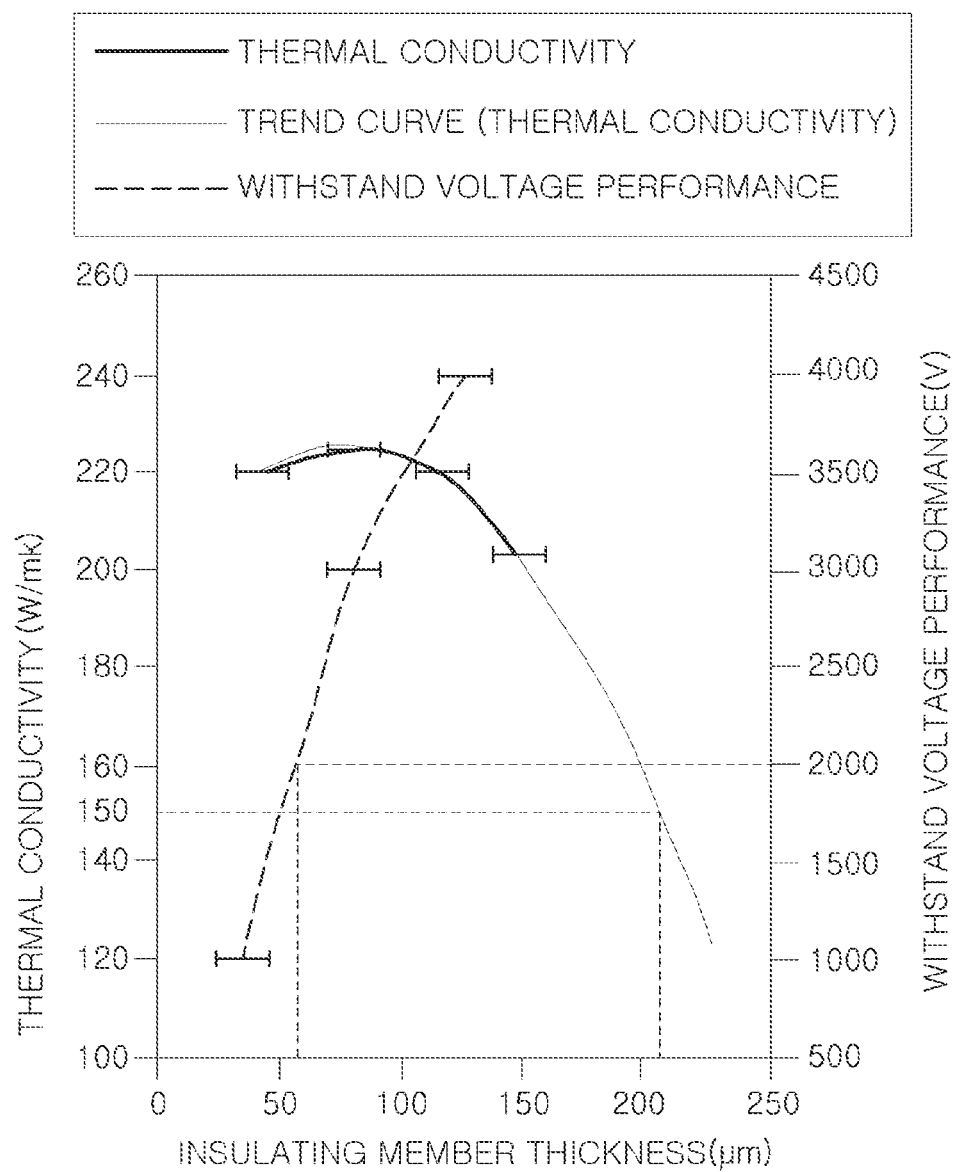
FIG. 5 is a graph illustrating a correlation between the thickness of an insulating member, withstand voltage performance, and thermal conductivity in the battery module according to an embodiment.

FIG. 2 is a front view illustrating a state in which the insulating member 30 is formed in the housing member 20 in the battery module according to an embodiment, and FIG. 5 is a graph illustrating the correlation between the thickness t and withstand voltage performance and thermal conductivity of the insulating member 30 in the battery module according to an embodiment.

Referring to the drawings to the graphs, the insulating member 30 of the battery module according to an embodiment may be characterized in that the thickness t is formed in a 50 to 200 μm.

By limiting the thickness (t) of the insulating member 30 as described above, a withstand voltage performance greater than the withstand voltage performance that the secondary battery cell 10 may withstand may be secured. Accordingly, the battery module according to an embodiment may have improved electrical stability, and a problem in which the cooling performance of the housing member 20 is deteriorated may be prevented.

As an example, the insulating member 30 may be formed to have a thickness t at which the withstand voltage performance is greater than at least 2000 kV, and to this end, the thickness t of the insulating member 30 has a lower limit greater than 60 μm. For example, the withstand voltage performance is in proportion to the thickness t of the insulating member 30, and by limiting the thickness t of the insulating member 30 to being greater than 60 μm, the withstand voltage performance may be limited to being greater than at least 2000 kV.

However, in consideration of the measurement error of the correlation between the withstand voltage performance and the thickness t of the insulating member 30, the insulating member 30 may have a lower limit of 50 μm, as a thickness t at which the withstand voltage performance is greater than at least 2000 kV.

Thereby, the problem of uncontrolled current flow with the housing member 20, occurrence of electric shorts, and damage to the secondary battery cell 10 due to insulation breakdown due to the voltage generated in the secondary battery cell 10 may be prevented.

In addition, the insulating member 30 is formed to have the thickness t having thermal conductivity greater than at least 150 W/mK, and to this end, the thickness t of the insulating member 30 is limited to an upper limit of less than 210 μm.

In detail, as illustrated in FIG. 5, it was confirmed through an experiment that the thermal conductivity of the insulating member 30 formed of an insulator is inversely proportional to the thickness t of the insulating member 30. Accordingly, the thickness t of the insulating member 30 is limited to be less than 210 μm so that the thermal conductivity is formed to be greater than at least 150 W/mK.

However, in consideration of the measurement error of the correlation between the thermal conductivity of the insulating member 30 and the thickness t, the thickness of the insulating member 30 may be limited to having an upper limit of 200 μm as a thickness t at which thermal conductivity is formed to be greater than at least 150 W/mK.

Accordingly, even when the insulating member 30 is provided in the housing member 20, a problem in that the cooling performance by the housing member 20 is deteriorated may be prevented.

In this case, the reference value of the thermal conductivity for which the upper limit of the thickness t of the insulating member 30 is set is limited to 150 W/mK, which is because the thermal conductivity of the housing member 20 is greater than at least 150 W/mK in the case in which the housing member 20 is formed of a material including aluminum. Accordingly, the thickness t of the insulating member 30 is also limited to be less than 210 μm so that the thermal conductivity is greater than at least 150 W/mK.

In addition, the insulating member 30 of the battery module according to an embodiment may have a thickness t of 70 to 150 μm.

For example, the thickness (t) range of the insulating member 30 is further limited to be formed in the range of 70 to 150 μm.

In the case of the limit of the thickness t of the insulating member 30 as described above, for example, in the case of the upper limit, the thickness t is limited such that the thermal conductivity of the insulating member 30 is greater than 180 W/mK, and in the case of the lower limit, the thickness t is limited such that the withstand voltage performance of the insulating member 30 is greater than 3000 kV.

In this case, the thickness t, at which the thermal conductivity by the insulating member 30 is formed to be greater than 180 W/mK, is 180 μm as an upper limit, and the thickness t, at which withstand voltage performance by the insulating member 30 is formed to be greater than 3000 kV, is 70 μm as a lower limit. However, in consideration of the measurement error of the correlation between the thermal conductivity and the thickness t of the insulating member 30 and the measurement error of the correlation between the withstand voltage performance and the thickness t of the insulating member 30, a range of the thickness t of the insulating member 30 is limited to 70 to 150 μm.

By limiting the thickness t of the insulating member 30, the problem of deteriorating the cooling performance of the battery module according to an embodiment including the housing member 20 by the insulating member 30 may be further prevented. In addition, the withstand voltage performance of the battery module according to an embodiment including the secondary battery cell 10 by the insulating member 30 may be improved.

In addition, the insulating member 30 of the battery module according to an embodiment may be characterized in that it is formed of a melanin resin, an acrylic resin, an epoxy resin, an olefin resin, an EVA resin, or a silicone resin.

All of these materials are insulators, and are materials capable of improving the withstand voltage performance by including the insulating member 30 in the battery module according to an embodiment.

In addition, the material of the insulating member 30 is not limited to the above-described materials, and any material formed of an insulator and capable of improving withstand voltage performance may be used as a material forming the insulating material according to an embodiment.

In addition, the insulating member 30 may be formed of a plurality of layers, and a material of at least one layer among the plurality of layers may be different, and a description thereof will be described later with reference to FIG. 3.

Figures 3, 4:
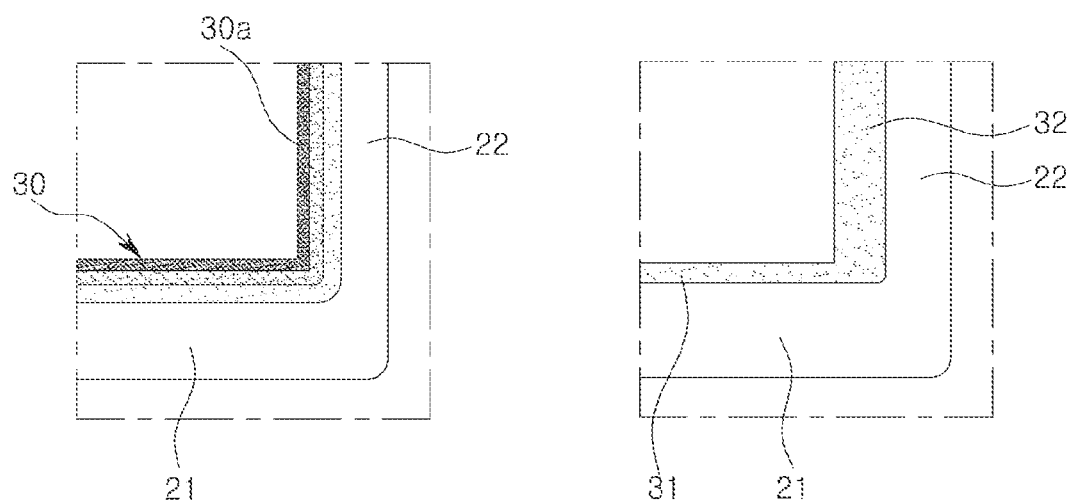
FIG. 3 is a front view illustrating an embodiment in which the insulating member is formed of a plurality of layers in the battery module according to an embodiment.
FIG. 4 is a front view illustrating an embodiment in which a sidewall insulating portion of the insulating member is formed to have a thickness greater than a thickness of a bottom insulating portion in the battery module according to an embodiment.

FIG. 3 is a front view illustrating an embodiment in which the insulating member 30 is formed of a plurality of layers in the battery module according to an embodiment. Referring to the drawing, the insulating member 30 of the battery module according to an embodiment is formed of a plurality of layers, and may be characterized in that the material of at least one layer is formed differently.

For example, the insulating member 30 may be formed of a plurality of layers, and the material of at least one layer may be formed differently from the others.

For example, in the insulating member 30, an outermost layer 30a closest to the secondary battery cell 10 may be formed of an epoxy-based resin, and the remaining layers may be formed of a melanin-based resin.

In this manner, even when the insulating member 30 is formed of a plurality of layers, the sum of the thicknesses of the plurality of layers (t) should be a value of the thickness (t) capable of maintaining thermal conductivity corresponding to thermal conductivity of the housing member 20, while preventing current flow.

For example, even when the insulating member 30 is formed of a plurality of layers, the sum of the thicknesses (t) of the plurality of layers may be 50 to 200 μm, or 70 to 150 μm.

In this case, in the insulating member 30 of the battery module according to an embodiment, the outermost layer 30a closest to the secondary battery cell 10 is formed of a material having a highest withstand voltage performance.

For example, since a portion of the insulating member 30 forming the outermost layer 30a is formed of a material having the highest withstand voltage performance, relatively high withstand voltage performance by the insulating member 30 may be further maintained.

FIG. 4 is a front view illustrating an embodiment in which a sidewall insulating portion 32 of the insulating member 30 is formed thicker than a bottom insulating portion 31 in the battery module according to an embodiment. Referring to the drawing, the insulating member 30 of the battery module according to an embodiment includes the bottom insulating portion 31 in contact with the bottom surfaces of a plurality of the secondary battery cells 10 and formed on the cooling plate member 21 of the housing member 20, and the sidewall insulating portion 32 provided at the edge of the cooling plate member 21 and formed on the sidewall member 22 of the housing member 20.

In this manner, the insulating member 30 may be specifically provided by being divided into a portion formed on the cooling plate member 21 and a portion formed on the sidewall member 22.

For example, the configuration of the insulating member 30 is specifically limited to be formed on both the cooling plate member 21 and The sidewall member 22.

However, the configuration of the present disclosure is not limited thereto, and the insulating member 30 may be formed only on the cooling plate member 21 or the sidewall, member 22 of the housing member 20.

In this case, the bottom insulating portion 31 of the battery module according to an embodiment may be formed to have a higher thermal conductivity than that of the sidewall insulating portion 32.

This is because the cooling plate member 21 on which the bottom insulating portion 31 is formed is disposed closer to a heat sink that radiates heat externally.

For example, since the bottom insulating portion 31 has a higher thermal conductivity than the sidewall insulating portion 32, the cooling performance may be further increased in terms of the entirety of the battery module according to an embodiment.

For example, in order for the bottom insulating portion 31 to have a higher thermal conductivity than the sidewall insulating portion 32, the bottom insulating portion 31 may have a thinner thickness t than that of the sidewall insulating portion 32.

In addition, the sidewall insulating portion 32 of the battery module according to an embodiment may have a withstand voltage performance higher than the bottom insulating portion 31.

By considering that the sidewall member 22 on which the sidewall insulating portion 32 is formed has a larger area, which faces the secondary battery cell 10, than an area of the cooling plate member 21 to have relatively higher possibility of insulation breakdown by the voltage generated in the secondary battery cell 10; the battery module may be configured as described above, such that the relatively higher withstand voltage performance of the sidewall insulating portion 32 is provided.

For example, since the sidewall insulating portion 32 has a withstand voltage performance higher than the bottom insulating portion 31, more electrical stability may be secured in terms of the entirety of the battery module according to an embodiment.

For example, in order for the sidewall insulating portion 32 to have a withstand voltage performance higher than the bottom insulating portion 31, the sidewall insulating portion 32 may have a thickness t greater than that of the bottom insulating portion 31.

In addition, the sidewall insulating portion 32 of the battery module according to an embodiment may be characterized in having a thickness t greater than the bottom insulating portion 31.

For example, the battery module according to an embodiment may be configured such that the sidewall insulating portion 32 has a withstand voltage performance higher than that of the bottom insulating portion 31, and inversely, may be configured such that the bottom insulating portion 31 has a higher thermal conductivity than that of the sidewall insulating portion 32.

As set forth above, a battery module according to an embodiment has an advantage of improving electrical stability by securing withstand voltage performance.

A battery module according to another embodiment has an advantage of maintaining cooling performance while ensuring electrical stability.

Accordingly, there is an effect of reducing costs and extending the life of the battery module while maintaining electrical stability and cooling performance.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
a plurality of secondary battery cells;
a housing member accommodating the plurality of the secondary battery cells therein; and
an insulating member disposed on an inner surface of the housing member, preventing flow of electrical current to the housing member, having a heat transfer function to discharge heat of the secondary battery cell externally, and formed to have a predetermined thickness,
wherein the housing member comprises:
a cooling plate member which forms a bottom of the housing member; and
a sidewall member which forms a side portion of the housing member,
wherein the insulating member comprises:
a bottom insulating portion disposed on the cooling plate member; and
a sidewall insulating portion disposed on the sidewall member,
wherein the bottom insulating portion and the sidewall insulating portion meet at two edges of the bottom insulating portion,
wherein the bottom insulating portion is configured to have a first predetermined thickness and the sidewall insulating portion is configured to have a second predetermined thickness, and
wherein the bottom insulating portion is configured to have a flat shape and the sidewall insulating portion is configured to have a flat shape.

2. The battery module of claim 1, wherein the insulating member has a thickness at which withstand voltage performance between the insulating member and the housing member is formed to be greater than at least 2000 kV.

3. The battery module of claim 1, wherein the insulating member has a thickness at which thermal conductivity, in a direction, parallel to a direction in which the insulating member and the housing member are combined, is greater than at least 150 W/mK.

4. The battery module of claim 1, wherein the insulating member is formed to have a thickness 50 µm to 200 µm.

5. The battery module of claim 1, wherein the insulating member is formed to have a thickness of 70 to 150 µm.

6. The battery module of claim 1, wherein the insulating member is formed of a melanin-based resin, an acrylic-based resin, an epoxy-based resin, an olefin-based resin, an EVA-based resin or a silicone-based resin.

7. The battery module of claim 1, wherein the insulating member is comprised of a plurality of layers, and at least one layer among the plurality of layers is formed of a different material.

8. The battery module of claim 7, wherein the insulating member is characterized in that an outermost layer closest to the secondary battery cell is formed of a material having a highest withstand voltage performance.

9. The battery module of claim 1, wherein the bottom insulating portion is formed to have thermal conductivity higher than thermal conductivity of the sidewall insulating portion.

10. The battery module of claim 1, wherein the sidewall insulating portion has a withstand voltage performance higher than a withstand voltage performance of the bottom insulating portion.

11. The battery module of claim 1, wherein the second predetermined thickness is greater than the first predetermined thickness.

12. A battery module comprising:
a plurality of secondary battery cells;
a housing member accommodating the plurality of the secondary battery cells therein; and
an insulating member disposed on an inner surface of the housing member, preventing flow of electrical current to the housing member, having a heat transfer function to discharge heat of the secondary battery cell externally, and formed to have a predetermined thickness,
wherein the housing member comprises:
a cooling plate member which forms a bottom of the housing member; and
a sidewall member which forms a side portion of the housing member,
wherein the insulating member comprises:
a bottom insulating portion disposed on the cooling plate member; and
a sidewall insulating portion disposed on the sidewall member, and
wherein the sidewall insulating portion is disposed on a substantially entire area of the sidewall member.

* * * * *